United States Patent
Keathley et al.

(10) Patent No.: US 6,247,129 B1
(45) Date of Patent: *Jun. 12, 2001

(54) SECURE ELECTRONIC COMMERCE EMPLOYING INTEGRATED CIRCUIT CARDS

(75) Inventors: Kimberly Ann Keathley, Castro Valley; Ann-Pin Chen, Foster City; Nancy McCusker, San Francisco, all of CA (US)

(73) Assignee: Visa International Service Association, Foster City, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/037,745

(22) Filed: Mar. 10, 1998

Related U.S. Application Data

(60) Provisional application No. 60/040,958, filed on Mar. 12, 1997.

(51) Int. Cl.$^7$ .................................................. H04L 9/00
(52) U.S. Cl. ........................ 713/156; 713/150; 713/152
(58) Field of Search ................... 705/1, 26, 35, 705/39, 40, 44; 713/200, 150; 380/52; 718/152, 156

(56) References Cited

U.S. PATENT DOCUMENTS

| Re. 33,571 | 4/1991 | Takahashi | 235/379 |
|---|---|---|---|
| 4,186,871 | 2/1980 | Anderson et al. | 235/380 |
| 4,197,986 | 4/1980 | Nagata | 235/379 |
| 4,211,919 | 7/1980 | Ugon | 235/487 |
| 4,214,230 | 7/1980 | Fak et al. | 340/149 |
| 4,219,151 | 8/1980 | Haruki | 235/379 |
| 4,223,403 | 9/1980 | Konheim et al. | 375/2 |

(List continued on next page.)

FOREIGN PATENT DOCUMENTS

| WO 9840982A1 | * 3/1998 | (WO) | H04K/1/00 |

*Primary Examiner*—Vincent Millin
*Assistant Examiner*—Cuong H. Nguyen
(74) *Attorney, Agent, or Firm*—Townsend and Townsend and Crew LLP

(57) ABSTRACT

A system for network-based electronic commerce employing integrated circuit cards is provided. In one embodiment, cardholder authentication is provided by use of on-card symmetric cryptographic processing. The cardholder thus need not be limited to performing transactions from any particular computer system. Asymmetric cryptographic techniques are employed for communication of transaction data over the network.

17 Claims, 4 Drawing Sheets

U.S. PATENT DOCUMENTS

| | | | |
|---|---|---|---|
| 4,268,715 | 5/1981 | Atalla | 178/22 |
| 4,271,482 | 6/1981 | Giraud | 364/900 |
| 4,283,599 | 8/1981 | Atalla | 178/22.1 |
| 4,288,659 | 9/1981 | Atalla | 178/22.08 |
| 4,302,810 | 11/1981 | Bouricius et al. | 364/200 |
| 4,304,990 | 12/1981 | Atalla | 235/380 |
| 4,309,569 | 1/1982 | Merkle | 178/22.08 |
| 4,317,957 | 3/1982 | Sendrow | 178/22.08 |
| 4,326,098 | 4/1982 | Bouricius et al. | 178/22.08 |
| 4,357,529 | 11/1982 | Atalla | 235/380 |
| 4,386,233 | 5/1983 | Smid et al. | 178/22.08 |
| 4,386,266 | 5/1983 | Chesarek | 235/380 |
| 4,408,203 | 10/1983 | Campbell | 340/825.34 |
| 4,423,287 | 12/1983 | Zeidler | 178/22.08 |
| 4,438,824 | 3/1984 | Mueller-Schloer | 178/22.08 |
| 4,467,139 | 8/1984 | Mollier | 178/22.08 |
| 4,471,216 | 9/1984 | Herve | 235/380 |
| 4,498,000 | 2/1985 | Decavele et al. | 235/380 |
| 4,529,870 | 7/1985 | Chaum | 235/380 |
| 4,536,647 | 8/1985 | Atalla et al. | 235/379 |
| 4,544,833 | 10/1985 | Ugon | 235/379 |
| 4,549,075 | 10/1985 | Saada et al. | 235/380 |
| 4,594,663 | 6/1986 | Nagata et al. | 364/401 |
| 4,612,413 | 9/1986 | Robert et al. | 178/22.08 |
| 4,629,874 | 12/1986 | Pugsley et al. | 235/380 |
| 4,630,201 | 12/1986 | White | 364/408 |
| 4,638,120 | 1/1987 | Herve | 178/22.08 |
| 4,652,698 | 3/1987 | Hale et al. | 380/24 |
| 4,656,474 | 4/1987 | Mollier et al. | 380/23 |
| 4,661,658 | 4/1987 | Matyas | 380/23 |
| 4,672,182 | 6/1987 | Hirokawa | 235/436 |
| 4,679,236 | 7/1987 | Davies | 380/23 |
| 4,700,055 | 10/1987 | Kashkashian, Jr. | 235/379 |
| 4,720,859 | 1/1988 | Aaro et al. | 380/23 |
| 4,723,284 | 2/1988 | Munck et al. | 380/25 |
| 4,725,719 | 2/1988 | Oncken et al. | 235/487 |
| 5,225,664 | 7/1993 | Iijima | 235/380 |
| 5,227,613 | 7/1993 | Takagi et al. | 235/380 |
| 5,239,166 | 8/1993 | Graves | 235/380 |
| 5,247,578 | 9/1993 | Pailles et al. | 380/24 |
| 5,276,736 | 1/1994 | Chaum | 380/24 |
| 5,285,200 | 2/1994 | Kuriyama | 340/825.34 |
| 5,293,029 | 3/1994 | Iijima | 235/380 |
| 5,293,424 | 3/1994 | Holtey et al. | 380/23 |
| 5,299,263 | 3/1994 | Beller et al. | 380/30 |
| 5,317,636 | 5/1994 | Vizcaino | 380/23 |
| 5,319,710 | 6/1994 | Atalla et al. | 380/23 |
| 5,323,465 | 6/1994 | Avarne | 380/23 |
| 5,337,358 | 8/1994 | Axelrod et al. | 380/23 |
| 5,341,426 | 8/1994 | Barney et al. | 380/21 |
| 5,343,529 | 8/1994 | Goldfine et al. | 380/23 |
| 5,347,580 | 9/1994 | Molva et al. | 380/25 |
| 5,355,413 | 10/1994 | Ohno | 380/24 |
| 5,371,797 | 12/1994 | Bocinsky, Jr. | 380/24 |
| 5,375,169 | 12/1994 | Scheidt et al. | 380/21 |
| 5,379,344 | 1/1995 | Larsson et al. | 380/23 |
| 5,396,558 | 3/1995 | Ishiguro et al. | 380/25 |
| 5,401,950 | 3/1995 | Yoshida | 235/487 |
| 5,402,490 | 3/1995 | Mihm, Jr. | 380/21 |
| 5,412,726 | 5/1995 | Nevoux et al. | 380/24 |
| 5,420,926 | 5/1995 | Low et al. | 380/24 |
| 5,422,953 | 6/1995 | Fischer | 380/23 |
| 5,428,684 | 6/1995 | Akiyama et al. | 380/25 |
| 5,434,919 | 7/1995 | Chaum | 380/30 |
| 5,440,635 | 8/1995 | Bellovin et al. | 380/25 |
| 5,446,796 | 8/1995 | Ishiguro et al. | 380/24 |
| 5,461,217 | 10/1995 | Claus | 235/380 |
| 5,473,689 | 12/1995 | Eberhard | 380/23 |
| 5,475,763 | 12/1995 | Kaufman et al. | 380/30 |
| 5,481,611 | 1/1996 | Owens et al. | 380/25 |
| 5,493,613 | 2/1996 | Denno et al. | 380/24 |
| 5,502,765 | 3/1996 | Ishiguro et al. | 380/24 |
| 5,559,887 | 9/1996 | Davis et al. | 380/24 |
| 5,602,915 | 2/1997 | Campana et al. | 380/21 |
| 5,602,917 | 2/1997 | Mueller | 380/21 |
| 5,604,801 | 2/1997 | Dolan et al. | 380/21 |
| 5,604,803 | 2/1997 | Aziz | 380/25 |
| 5,604,804 | 2/1997 | Micali | 380/25 |
| 5,610,982 | 3/1997 | Micali | 380/25 |
| 5,706,349 | 1/1998 | Aditham et al. | 380/25 |
| 5,721,781 | 2/1998 | Deo et al. | 380/25 |
| 5,742,756 | 4/1998 | Dillaway et al. | 380/25 |
| 5,754,656 | 5/1998 | Nishioka et al. | 705/26 |
| 5,778,071 * | 1/1999 | Caputo | 713/159 |
| 5,862,223 * | 1/1999 | Walker et al. | 705/50 |
| 5,892,900 * | 4/1999 | Ginter et al. | 713/200 |

* cited by examiner

SECURE ELECTRONIC COMMERCE EMPLOYING INTEGRATED CIRCUIT CARDS

STATEMENT OF RELATED APPLICATIONS

This application claims priority from U.S. Provisional Application No. 60/040,958 filed on Mar. 12, 1997, the contents of which are herein incorporated by reference.

BACKGROUND OF THE INVENTION

The present invention relates to electronic commerce and more particularly to systems and methods for using a network for electronic commerce.

The Internet is a new means by which consumers can access and purchase information, communicate and pay for services, and acquire and pay for goods. Because of the anonymous nature of communication networks, new methods and systems must be developed to substitute for existing procedures used in face-to-face or mail order/telephone order transactions. These methods and systems should provide confidential transmission, authentication of parties involved, and assurance of the integrity of payment instructions for goods and services.

To achieve these objectives and others, the Secure Electronic Transaction (SET) Specification has been developed. The SET protocol allows customers to make payment card transactions securely over the Internet. However, transactions made using this protocol generally involve an initial cardholder registration process that requires account data to be entered manually (e.g., via a keyboard at the cardholder's personal computer (PC)). The SET protocol supports several levels of security, some of which are only accessible if cardholder-related data is stored on the cardholder access device, generally limiting the availability of such security to the cardholder's own PC. The use of SET does not allow the issuer to authenticate that a card was present or that the cardholder was genuine when authorizing payment transactions.

What is needed is a system that enhances transaction security over the Internet by verifying presence of a card while providing freedom to the user to initiate transactions from multiple card access devices.

SUMMARY OF THE INVENTION

By virtue of the present invention, a system for network-based electronic commerce employing integrated circuit cards is provided. In one embodiment, cardholder authentication is provided by use of on-card symmetric cryptographic processing. The cardholder thus need not be limited to performing transactions from any particular computer system. Asymmetric cryptographic techniques are employed for communication of transaction data over the network.

According to a first embodiment of the present invention, a computer-implemented method for processing transactions over a network is provided. The method includes steps of: establishing a connection between a card access device coupled to the network and an integrated circuit card, transferring a cryptogram generation command comprising challenge data from the card access device to the integrated circuit card, in response to the cryptogram generation command, using the integrated circuit card to encrypt the challenge data to form a response, transferring the response from the integrated circuit card to the card access device, forming a payment instruction message at the card access device, the payment instruction message including the response, encrypting at least a portion of the payment instruction message using asymmetric cryptographic techniques.

A second embodiment of the present invention provides a computer program product for facilitating secure electronic commerce. The product is for use with a computer coupled to a network and a card reading device. The product includes: code for establishing a connection between the computer and an integrated circuit card in communication with the card reading device, code for transferring a cryptogram generation command comprising challenge data from the computer to the integrated circuit card, code for receiving a response to the cryptogram generation command from the integrated circuit card, code for forming a payment instruction message, the payment instruction message including the response, and a computer-readable medium for storing the codes.

A third embodiment of the present invention provides an integrated circuit card. The integrated circuit card includes: an interface for receiving external commands and data, a symmetric cryptographic processor that encrypts a challenge value received via the interface to form a response to transmit via the interface, an asymmetric cryptographic processor that encrypts a value received from the interface using a private key unique to the integrated circuit card, and a memory storing the key and a certificate including a public key matching the private key unique to the integrated circuit card, the public key being signed by a private key of a certificate authority.

A further understanding of the nature and advantages of the inventions herein may be realized by reference to the remaining portions of the specification and the attached drawings.

DESCRIPTION OF SPECIFIC EMBODIMENTS

The discussion that follows assumes a familiarity with cryptographic techniques. A good general reference is Schneier, Applied Cryptography Second Edition (John Wiley & Sons, 1996), the contents of which are herein incorporated by reference.

Figure 1:
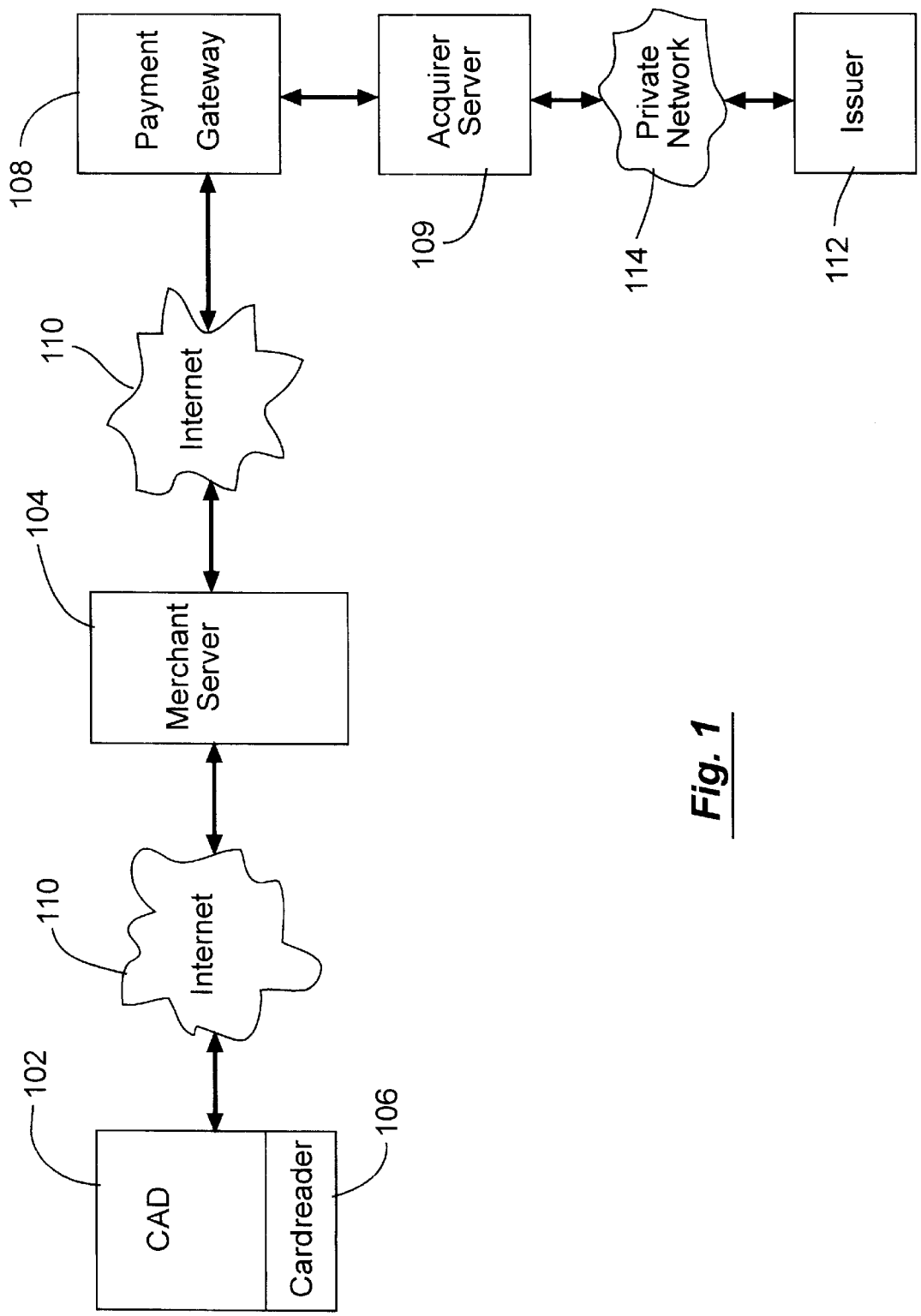
FIG. 1 depicts a general architecture for electronic commerce according to one embodiment of the present invention.

FIG. 1 depicts a general architecture for electronic commerce according to one embodiment of the present invention. A cardholder employs a cardholder access device (CAD) 102 to order merchandise, services, or information from a merchant that operates a merchant server system 104. CAD 102 includes a card reading device 106. CAD 102 may be, for example, a cardholder's PC or a public kiosk.

Payment for the cardholder's order is arranged through a payment gateway 108. Payment gateway 108 in turn interacts with other computer systems such as an acquirer server 109. These other computer systems are not shown. Communication among merchant server 104, payment gateway 108, and CAD 102 is preferably through the Internet 110. A private connection is used between payment gateway 108 and acquirer server 109.

Merchant server 104 is a system that interfaces with CAD 102 to offer goods or services in return for electronic payment. Merchant server 104 interfaces with payment gateway 108 to process electronic commerce transactions. Payment gateway 108 is a logical entity that provides electronic commerce services to the merchants in support an acquirer and interfaces to acquirer server 109 to support the authorization and capture of electronic commerce transactions. The acquirer is typically a financial institution that supports merchants by providing services for processing electronic transactions.

Acquirer server 109 in turn interacts with a card issuer 112. According to one embodiment of the present invention, card issuer 112 helps authenticate a card inserted into integrated circuit card 106. Issuer 112 and payment gateway 108 preferably interact through a private network 114 rather than the Internet 110.

In a preferred embodiment, interaction among CAD 102, merchant server 104, and payment gateway 108 is defined in part according to the SET Secure Electronic Transaction Specification (Version 1.0 May 31, 1997) published by Visa, the assignee of the present application, and MasterCard. This document will be referred to herein as the "SET Specification" and incorporated by reference for all purposes.

Figure 2:
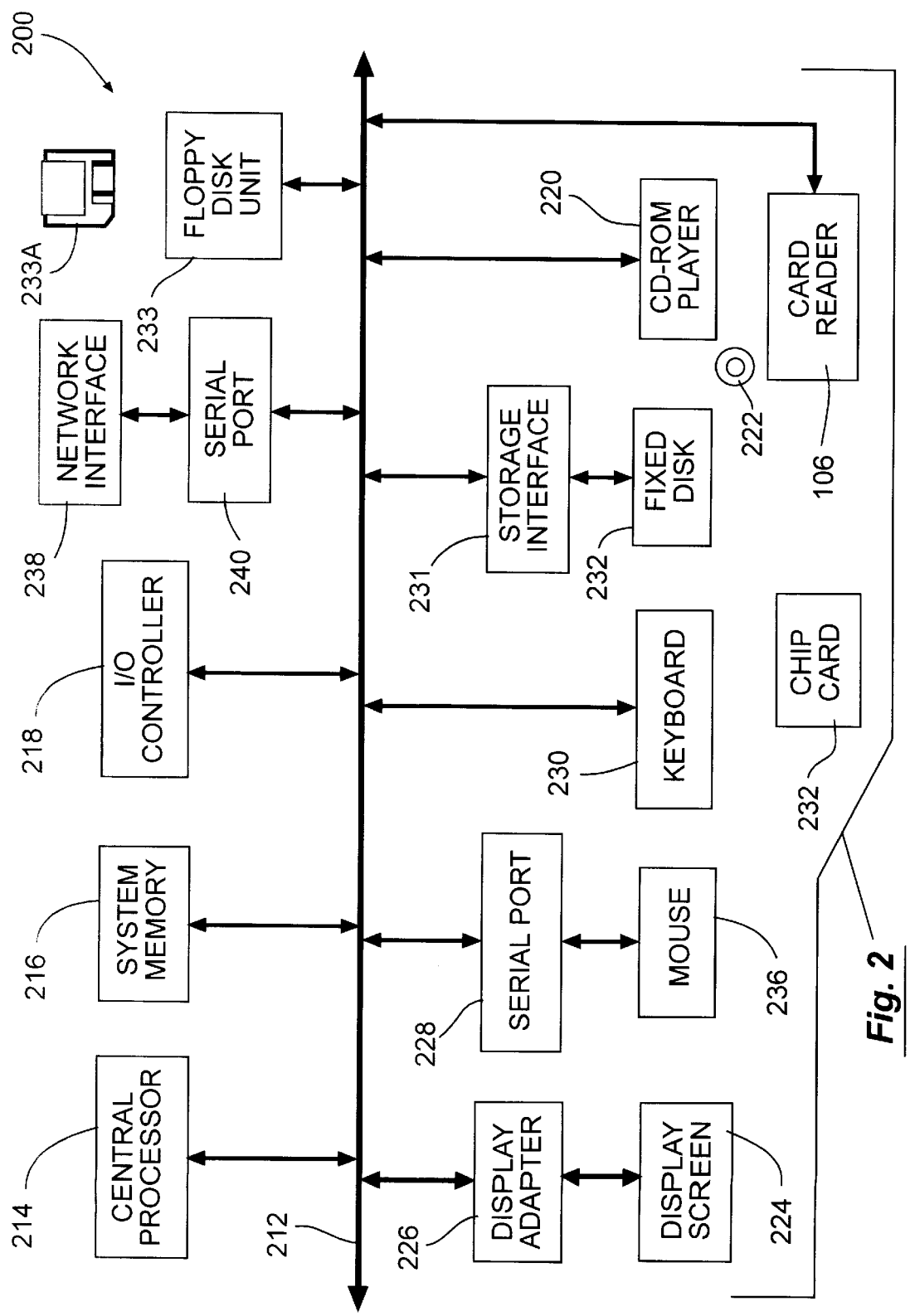
FIG. 2 depicts a computer system suitable for use with the present invention.

FIG. 2 depicts a computer system suitable for use with the present invention. FIG. 2 shows basic subsystems of a computer system 200 suitable for use with the present invention. Computer system 200 may represent the implementation of payment gateway 108, merchant server 104, or CAD 102. In FIG. 2, computer system 200 includes a bus 212 which interconnects major subsystems such as a central processor 214, a system memory 216, an input/output controller 218, a CD-ROM player 220 operative to receive a CD-ROM 222, a display screen 224 via a display adapter 226, a serial port 228, a keyboard 230, a storage interface 231 connected to a fixed disk drive 232, and a floppy disk drive 233 operative to receive a floppy disk 233A. Many other devices may be connected such as a mouse 236 connected to serial port 228 or a network interface 238 through another serial port 240. Many other devices or subsystems (not shown) may be connected in a similar manner. Also, it is not necessary for all of the devices shown in FIG. 2 to be present to practice the present invention, as discussed below. The devices and subsystems may be interconnected in different ways from that shown in FIG. 2. The operation of a computer system such as that shown in FIG. 2 is readily known in the art and is not discussed in detail in the present application. Source code to implement the present invention may be operably disposed in system memory 216 or stored on storage media such as fixed disk 232 or floppy disk 233A, fixed disk 232, or CD-ROM 232.

When computer system 200 implements a CAD, card reading device 106 is also connected as part of computer system 200. Card reading device 106 may accept an integrated circuit card (ICC) 234.

Figure 3:
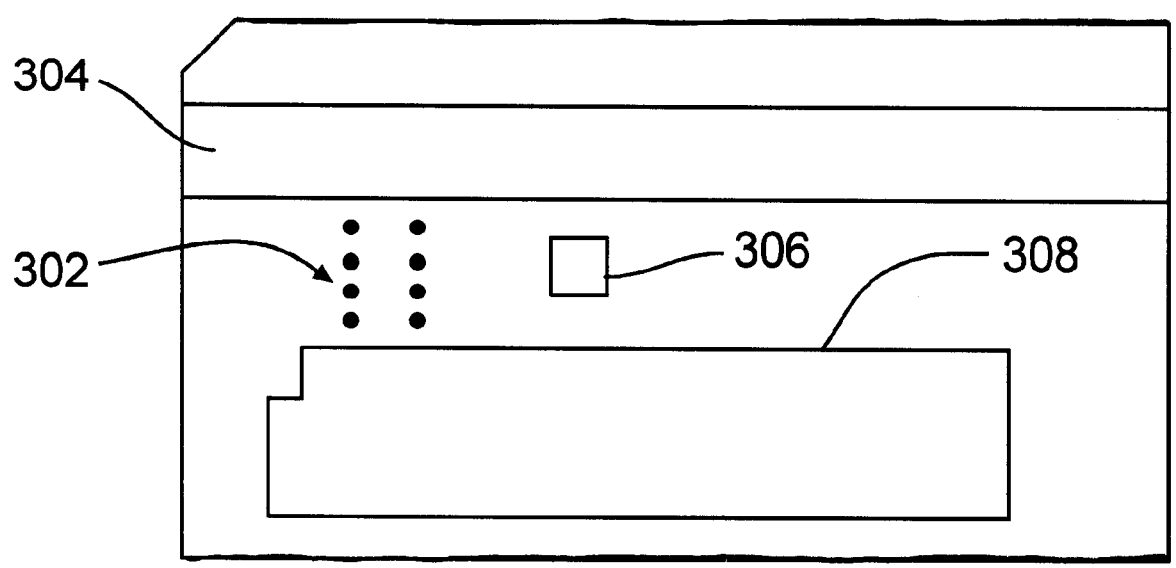
FIG. 3 depicts an integrated circuit card according to one embodiment of the present invention.

FIG. 3 depicts ICC 234 according to one embodiment of the present invention. Various mechanical and electrical characteristics of ICC 234 and aspects of its interaction with card reading device 106 are defined by the following specifications, all of which are herein incorporated by reference.

*Visa Integrated Circuit Card Specification*, (Visa International Service Association 1996).

*EMV Integrated Circuit Card Specification for Payment Systems*, (Visa International Service Association 1996).

*EMV Integrated Circuit Card Terminal Specification for Payment Systems*, (Visa International Service Association 1996).

*EMV Integrated Circuit Card Application Specification for Payment Systems*, (Visa International Service Association 1996).

*International Standard: Identification Cards—Integrated Circuit(s) Cards with Contacts, Parts* 1–6 (International Standards Organization 1987–1995).

Besides the electronic commerce features discussed in the present application, ICC 234 may provide the functionality of a credit card, debit card, ATM card, stored value card, identification card, etc. ICC 234 includes electrical contacts 302 for receiving power and exchanging information with card reading device 106. A magnetic stripe 304 allows storage of information for reading by magnetic stripe readers. An integrated circuit 306 includes a processor and memory for storing application information. An embossing area 308 is available for imprinting the cardholder name, account number, and expiration date.

The combination of memory and processor preferably implements a symmetric cryptographic processor and in certain embodiments an asymmetric cryptographic processor. The symmetric cryptographic processor preferably uses the DES algorithm to encrypt an externally generated value employing a symmetric key. The asymmetric cryptographic processor preferably uses the RSA algorithm to encrypt an externally generated value employing a private asymmetric key. The symmetric key and asymmetric key are preferably stored in memory so as to be inaccessible to external devices interacting with integrated circuit card 234.

The use of SET ensures the integrity and authenticity of cardholder account data transmitted through the Internet and does not require the use of an ICC or any physical payment card to initiate a purchase transaction. SET defines the transmission of a digital signature from CAD 102 to merchant server 104 and payment gateway 108 to ensure that the data transmitted from the cardholder has not been changed. According to the present invention, this digital signature operation may be performed either by CAD 102 or by ICC 234. In conjunction with the digital signatures, the SET protocol allows the transmission of a certificate chain to the merchant, validating a relationship between the cardholder and issuer. According to the present invention, this certificate chain, if used, may be stored either on CAD 102 or on ICC 234.

According to SET, cardholder certificates function as electronic representation of a payment card. Each cardholder certificate is digitally signed by a financial institution using the private key of the financial institution. Thus the cardholder certificate can only be generated by a fmancial institution and cannot be altered by a third party. The cardholder certificate includes the public signature key of the cardholder, and a hash of the cardholder's account information and secret value known to the SET software operating on CAD 102. All of this data is signed with the private signature key of the financial institution. This certificate is transmitted to merchants with purchase requests and encrypted payment instructions. SET does not mandate the use of cardholder certificates but allows for their use to enhance security.

The cardholder certificate is verifiable through a hierarchy of trust. The cardholder certificate is linked to a signature certificate of the entity, a cardholder certificate authority (CCA), that digitally signed the cardholder certificate. The signature certificate of the CCA includes the public signature key of the CCA signed by geopolitical certificate authority (GCA) with its own private signature key. The CCA certificate is linked to a GCA certificate which includes the public signature key of the GCA signed by the payment brand (e.g., Visa, MasterCard, etc.) with its private signature key. The GCA certificate is linked to a payment brand certificate that includes the public signature key of the payment brand as signed by a root authority with its private signature key. The payment brand certificate is in turn linked to a root authority certificate which includes the root's public signature key signed by the root's private key.

For each payment brand, there may be a GCA for each country. A recipient of the cardholder certificate will be able to verify it using the public signature key of the CCA. The public signature key of the CCA is verifiable by use of the public signature key of the GCA to decrypt the CCA certificate. In turn, the public signature key of the GCA is verifiable by using the payment brand public key to decrypt the GCA certificate. The payment brand public signature key is verifiable by using the root public signature key to decrypt the payment brand certificate. Thus, a merchant may verify a cardholder by traversing the certificate chain. SET provides for the certificate chain to be maintained on CAD 102. According to the present invention, the certificate chain may also be stored on ICC 234.

In one embodiment, the present invention augments the protections provided by SET using on-line authorization by issuer 112. Integrated circuit card 234 generates an authorization request cryptogram (ARQC) which is used by issuer 112 to authenticate the card.

The discussion that follows refers to three exemplary embodiments. In a first embodiment referred to as "Option 1," integrated circuit card 234 incorporates asymmetric cryptographic processing and stores a cardholder certificate and the chain of certificates leading from the cardholder certificate to the root. In a second embodiment referred to as "Option 2," integrated circuit card 234 does not incorporate asymmetric cryptographic processing and does not store the cardholder certificate and the other certificates of the chain. In "Option 2," however, a cardholder certificate and certificate chain are associated with integrated circuit but stored on CAD 102 which is capable of asymmetric cryptographic processing. In a third embodiment referred to as "Option 3," integrated circuit card 234 does not incorporate asymmetric cryptographic processing and does not store the cardholder certificate and the other certificates of the chain. Also, there is no cardholder certificate associated with this card and stored by CAD 102.

Figure 4:
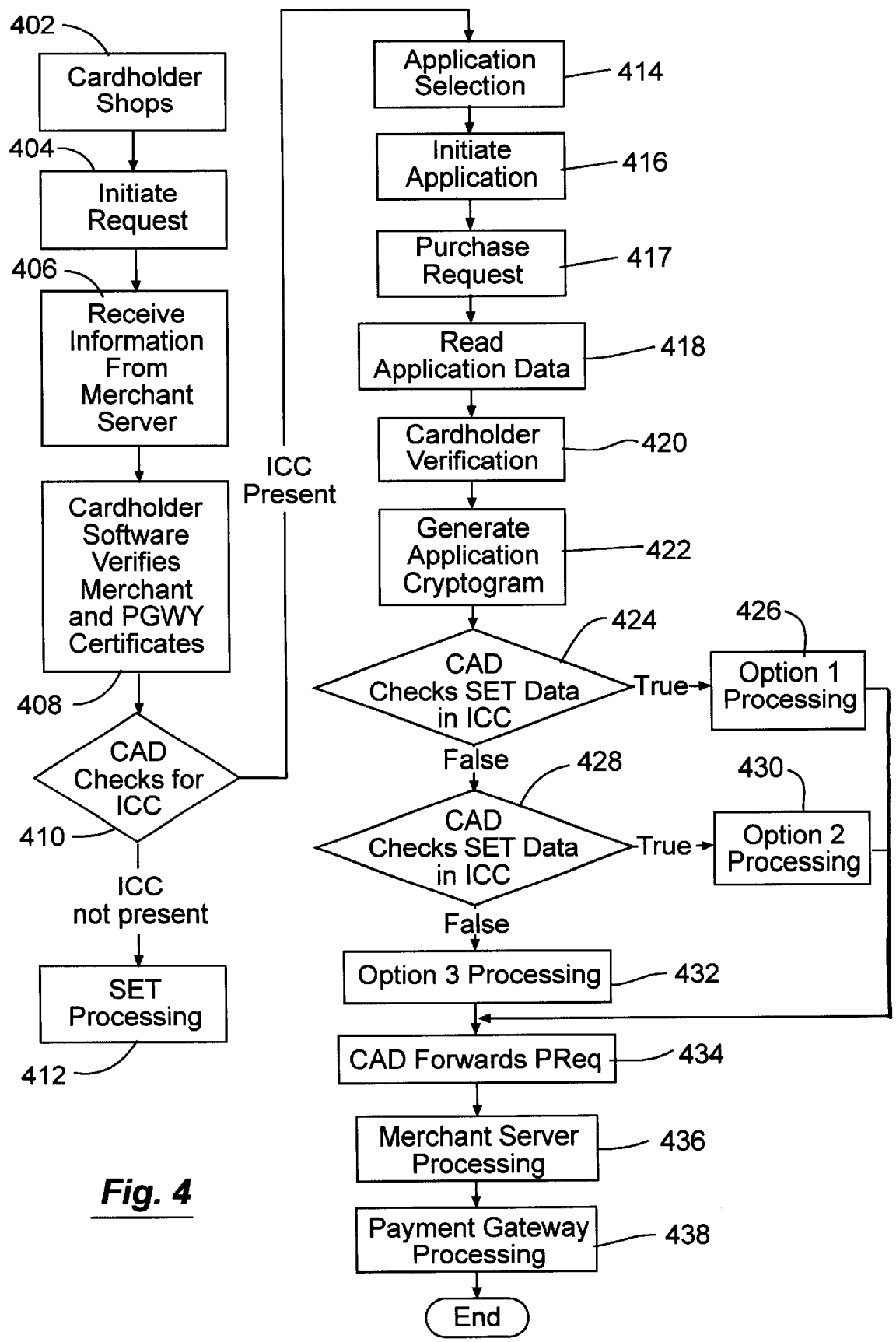
FIG. 4 is a top-level flowchart describing steps of transaction processing according to one embodiment of the present invention.

FIG. 4 is a top-level flowchart describing steps of transaction processing according to one embodiment of the present invention. Prior to processing of the transaction, at step 402, the cardholder shops, e.g., by browsing through the merchant's website. CAD 102 may be equipped with an HTTP-compatible browser to facilitate viewing catalog information stored on merchant server 104. At step 404, after the user has decided to purchase particular goods or services, he or she initiates a request, e.g., by selecting a link or screen button within the browser. Merchant server 104 receives the request and responds by sending CAD 102 a merchant certificate and a payment gateway certificate at step 406. The merchant certificate includes the public key-exchange key of the merchant. The payment gateway certificate includes the public key-exchange key of the payment gateway. These certificates are signed with the private keys of CCAs to which the merchant and payment gateway are assigned. At step 408, software on CAD 102 verifies the merchant and payment gateway certificates by traversing the certificate chain to the root key.

At step 410, CAD 102 checks for the presence of integrated circuit card 234 in card reading device 106. If integrated circuit card 234 is not present, further operation is in accordance with SET techniques at step 412. If integrated circuit card 234 is present, processing proceeds to step 414 where CAD 102 selects the particular application on integrated circuit card 234 that incorporates the features of the present invention. According to the various EMV Specifications and the VIS Specification, integrated circuit card 234 may support multiple applications. If integrated circuit card 234 operates according to the VIS specification, the selected application is preferably a credit/debit application and there need not be a separate application defined for networked electronic commerce.

At step 416, initial application processing functions are performed between CAD 102 and integrated circuit card 234. CAD 102 issues a command to integrated circuit card 234 to retrieve a list of files and records stored on the card and related to the selected application. This command also retrieves a list of functions supported by the selected application. This list will indicate whether integrated circuit card 234 supports cardholder verification.

At step 417, CAD 102 sends a purchase initialization request to merchant server 104 in accordance with SET. The purchase initialization request includes the brand of integrated circuit card 234, e.g., "Visa." In response, merchant server 104 sends a purchase initialization request response to CAD 102. The purchase initialization request response preferably includes a transaction identifier uniquely identifying the transaction among other data specified by SET.

At step 418, CAD 102 retrieves the listed files and records associated with the selected application from integrated circuit card 234. The retrieved information includes the cardholder's personal account number (PAN) and expiration date. For Option 1 cards, CAD 102 reads the cardholder certificate and certificate chain from integrated circuit card 234. According to the present invention, integrated circuit card 234 may also store a URL identifying a network address of the payment brand. CAD 102 retrieves this URL and accesses the identified network address to retrieve and display images identifying the card issuer and payment brand.

At step 420, CAD 102 performs cardholder verification if this is supported by integrated circuit card 234. Included in the files and records retrieved at step 418 is a list of cardholder verification methods supported by the card. The preferred method of cardholder verification is offline PIN processing. If CAD 102 also supports offline PIN processing, the cardholder is prompted for entry of his or her PIN. CAD 102 sends the entered PIN as cleartext to integrated circuit card 234. Integrated circuit card 234 compares the entered PIN with a reference PIN and returns the results of the comparison to CAD 102. CAD 102 records whether offline PIN processing was performed, whether a PIN was actually entered, and the results of the comparison to the reference PIN.

Step 422 begins an on-line authorization procedure where issuer 112 may verify the authenticity of integrated circuit card 234. CAD 102 requests generation of an authorization request cryptogram (ARQC) if PIN entry was successful, or an application authorization cryptogram (AAC) if PIN entry was not successful. A request for an AAC is tantamount to declining the transaction. The request for an ARQC or AAC includes variable data particular to the transaction, preferably including an amount authorized by the merchant, a transaction currency code previously supplied by the merchant, transaction date, and an unpredictable number.

In response to the request for an ARQC, integrated circuit card 234 preferably performs various card risk management functions including checking for previous authentication failures, PIN entry results, and other risk factors. If an AAC has been requested by CAD 102 or any of the risk factors are present, integrated circuit card 234 returns an AAC to CAD 102. CAD 102 responds to the AAC by terminating the transaction. If an ARQC has been requested and integrated circuit card 234 previously successfully performed the PIN comparison, integrated circuit card 234 responds by returning an ARQC.

Both an ARQC and an AAC preferably include the variable data listed above encrypted with a symmetric key unique to integrated circuit card 234. In a preferred embodiment, the encryption algorithm is DES. Ultimately, the ARQC is sent to issuer 112 for on-line authentication of the card. Receipt of an AAC by CAD 102 result in termination of the transaction.

The unpredictable number is formed by CAD 102 through the following process. The transaction identifier, which is preferably a 20 byte value is divided into five 4-byte blocks. The first (leftmost) block is exclusive-ORed with the second block. The result of this first exclusive OR operation is exclusive-ORed with the third block. The result of the second exclusive OR operation is exclusive-ORed with the fourth block. The result of the third exclusive OR operation is exclusive-ORed with the fifth (rightmost) block to form the unpredictable number.

How CAD 102 formulates a purchase request to the merchant will depend on whether this is an Option 1, Option 2, or Option 3 system. At step 424, CAD 102 checks whether SET-related data including the cardholder certificate chain and a value known as the PAN secret are stored on integrated circuit card 234 indicating that the card is configured for Option 1. The PAN secret is the result of exclusive-ORing an arbitrary number associated with the card with an arbitrary number associated with the issuer. If the card is configured for Option 1, formulation of the purchase request occurs at step 426.

If the card is not configured for Option 1, CAD 102 checks at step 428 to see if it has the cardholder certificate chain and PAN secret internally stored, indicating an Option 2 system. If this is an Option 2 system, the purchase request is formulated at step 430. If the cardholder certificate chain and PAN secret are present on neither integrated circuit card 234 nor CAD 102, this indicates an Option 3 system and the purchase request is formulated at step 432.

According to SET, a purchase request includes two parts, order information (OI) and payment instructions (PI). The OI identifies the order to the merchant. The PI is not reviewed by the merchant but is instead forwarded to payment gateway 108. When a cardholder certificate is available, SET provides for generation of a dual signature for the OI and PI. Message digests for both the OI and PI are generated and concatenated. The message digest of the concatenation result is generated and encrypted using the cardholder private signature key to form a dual signature. The PI is encrypted with a randomly generated symmetric key. This randomly generated symmetric key along with the cardholder's account information is encrypted with the private key-exchange key of the payment gateway. The purchase request as sent to the merchant includes the encrypted PI and OI. The purchase request also includes the cardholder certificate chain.

In the case of Option 1 processing at step 426, CAD 102 creates the PI and OI as defined by the SET Specification. Where the personal account number and expiration date would normally appear in the PI, CAD 102 includes a series of zeroes. CAD 102 forms a special data object including certain integrated circuit card-related data. This data includes the ARQC and the cleartext data encrypted within the ARQC including the unpredictable number. This special data object is embedded in the PI. All of the steps of generating the purchase request are performed by CAD 102 except for encrypting the message digest of the concatenation result using the cardholder private key. This step is performed by integrated circuit card 234. In a preferred embodiment where integrated circuit card 234 conforms to the VIS specification, this encryption is performed using the INTERNAL AUTHENTICATE command included in the specification.

Option 2 processing at step 430 is the same as Option 1 processing at step 426, except that all steps of forming the purchase request are now performed by CAD 102 including encrypting the message digest of the concatenation result using the cardholder private key.

In the case of Option 3 processing at step 432, CAD 102 creates the PI and OI as defined by the SET specification. As with Option 1 and Option 3, the integrated circuit card-related data is included with the PI. However, no dual signature is created for the payment request.

At step 434, CAD 102 sends the purchase request to merchant server 104. At this time, integrated circuit card 234 is no longer needed to complete the transaction and CAD 102 may prompt the cardholder to remove his or her card from card reading device 106.

At step 436, merchant server 104 processes the purchase request in accordance with SET. A portion of the purchase request is the PI which is forwarded to payment gateway 108.

At step 438, payment gateway 108 processes the PI. Payment gateway 108 decrypts the PI using its private key-exchange key. After decrypting the PI, payment gateway 108 checks for the card-related data in the PI to determine if the purchase request involved use of an integrated circuit card. Once this has been verified, payment gateway 108 recalculates the unpredictable number from the transaction identifier and the merchant identifier it obtains from the ARQC. The result is compared with the unpredictable number transmitted within the PI. If there is no match, the transaction is rejected. The PAN and card expiration date are decrypted.

Payment gateway 108 sends issuer 112 via acquirer server 109 an authorization request that includes the data related to the payment transaction. The authorization request also preferably includes information indicating whether or not SET certificates were used and whether these certificates were present on integrated circuit card 234. Issuer 112 is aware of the unique symmetric key of the cardholder and attempts to verify the ARQC from the cleartext information included in the integrated circuit card related data. Issuer 112 applies the unique cardholder key to symmetrically encrypt the cleartext information and obtain ARQC'. If ARQC' matches ARQC, issuer 112 sends an authorization response message to payment gateway 108 indicating that the transaction is authorized by issuer 112. Payment gateway 108 responds to receipt of this authorization request message by sending an authorization message to merchant server 104. Merchant server 104 may then fulfill the order.

The card authentication operation of user 118 provides security that enhances or substitutes for the protection offered by the SET cardholder certificate. This security is potentially available to the cardholder through multiple acceptance devices, offering portability unavailable with prior art networked electronic commerce technologies.

In the foregoing specification, the invention has been described with reference to specific exemplary embodiments thereof. It will, however, be evident that various modifications and changes may be made thereunto without departing from the broader spirit and scope of the invention as set forth in the appended claims and their full scope of equivalents. For example, the specification has discussed enhancements to the EMV, VIS, and SET specifications. The present invention is not, however, limited to use with any particular protocol or specification for cards electronic commerce.

What is claimed is:

1. A computer-implemented method for securely processing commercial transactions over a network, comprising the steps of:
   providing a card access device;
   providing an integrated circuit card;
   establishing a connection between the card access device and the integrated circuit card, wherein the card access device is coupled to the network;
   providing a cryptogram generation command comprising challenge data;
   transferring the cryptogram generation command from the card access device to the integrated circuit card;
   encrypting the challenge data using the integrated circuit card to form a response, wherein the step of encrypting the challenge data is in response to the cryptogram generation command;
   transferring the response from the integrated circuit card to the card access device;
   forming a payment instruction message at the card access device, wherein the payment instruction message comprises the response; and
   encrypting at least a portion of the payment instruction message using asymmetric cryptographic techniques wherein the two encrypting steps are part of a same commercial transaction.

2. The computer-implemented method for processing transactions of claim 1, further comprising the step of reading the cardholder certificate from the integrated circuit card.

3. The computer-implemented method for processing transactions of claim 1, further comprising the step of reading a certificate chain from the integrated circuit card.

4. The computer-implemented method for processing transactions of claim 3, wherein the certificate chain includes a chain of certificates leading from the integrated circuit card to a root.

5. The computer-implemented method for processing transactions of claim 1, further comprising a step of verifying the authenticity of the integrated circuit card.

6. The computer-implemented method for processing transactions of claim 5, wherein the verifying step includes decrypting the challenge data remotely from the integrated circuit card.

7. The computer-implemented method for processing transactions of claim 1, further comprising a step of sending the encrypted payment instruction message from the card access device to a merchant via the network.

8. The computer-implemented method for processing transactions of claim 1, wherein the step of encrypting the payment instruction message comprises using a symmetric key to encrypt the at least a portion of the payment instruction message and encrypting the symmetric key with a public key of a payment processor.

9. The computer-implemented method for processing transactions of claim 1, further comprising the steps of:
   forming an order information message at the card access device;
   hashing the order information message to obtain a digest of the order information message;
   hashing the payment instruction message to obtain a digest of the payment instruction message;
   concatenating the digest of the order information message and the digest of the payment instruction message to obtain a concatenated digest; and
   encrypting the concatenated digest with a private signature key particular to the integrated circuit card to obtain a signed concatenated digest.

10. The computer-implemented method for processing transactions of claim 9, wherein the private signature key is inaccessible to the interface.

11. The computer-implemented method for processing transactions of claim 9, wherein the step of encrypting the concatenated digest step is performed by the integrated circuit card.

12. The computer-implemented method for processing transactions of claim 9, wherein the encrypting the concatenated digest step is performed by the card access device.

13. The computer-implemented method for processing transactions over a network of claim 1, wherein the challenge data comprises an unpredictable number.

14. The computer-implemented method for processing transactions over a network of claim 13, wherein the unpredictable number is derived from an identifier identifying a particular merchant and an identifier identifying a particular transaction.

15. The computer-implemented method for processing transactions of claim 1, further comprising the steps of:
   forming an order information message at the card access device;
   hashing the order information message to obtain a digest of the order information message;
   hashing the payment instruction message to obtain a digest of the payment instruction message;
   concatenating the digest of the order information message and the digest of the payment instruction message to obtain a concatenated digest; and
   encrypting the concatenated digest with a private signature key particular to the integrated circuit card to obtain a signed concatenated digest.

16. An integrated circuit card for use in secure electronic commerce, comprising:
   an interface for receiving external commands and data;
   a symmetric cryptographic processor that encrypts a challenge value received via the interface to form a response for transmission via the interface;
   an asymmetric cryptographic processor that encrypts a value received from the interface using a first private key unique to the integrated circuit card; and
   a memory storing the first private key and a certificate comprising a public key matching the first private key unique to the integrated circuit card, the public key being signed by a second private key of a certificate authority.

17. A computer-implemented method for securely processing commercial transactions over a network, comprising the steps of:

establishing a connection between a card access device and an integrated circuit card, wherein the card access device is coupled to the network;

transferring a cryptogram generation command from the card access device to the integrated circuit card, wherein:
  the cryptogram generation command comprises challenge data, and
  the challenge data comprises an unpredictable number;

encrypting the challenge data using the integrated circuit card to form a response, wherein the step of encrypting the challenge data is in response to the cryptogram generation command;

transferring the response from the integrated circuit card to the card access device;

reading the cardholder certificate from the integrated circuit card;

reading a certificate chain from the integrated circuit card, wherein the certificate chain includes a chain of certificates leading from the integrated circuit card to a root;

forming a payment instruction message at the card access device, wherein the payment instruction message comprises the response;

encrypting at least a portion of the payment instruction message using asymmetric cryptographic techniques, wherein the step of encrypting the payment instruction message comprises using a symmetric key to encrypt the at least a portion of the payment instruction message and encrypting the symmetric key with a public key of a payment processor; and sending the encrypted payment instruction message from the card access device to a merchant via the network.

* * * * *